Patented Feb. 16, 1937

2,071,091

UNITED STATES PATENT OFFICE 2,071,091

CHEMICAL MANUFACTURE

Maurice C. Taylor, Niagara Falls, N. Y., assignor to The Mathieson Alkali Works, Inc., New York, N. Y., a corporation of Virginia No Drawing. Application July 13, 1936, Serial No. 90,443

11 Claims. (Cl. 167—17)

This invention provides an improved fungicide and bactericide and an improved sterilization process involving the application of chlorous acid and salts of chlorous acid, chlorites, to the killing of fungi and bacterial organisms.

I have found that chlorous acid and the salts of chlorous acid, chlorites, are effective fungicides and bactericides when used in media the pH value of which is less than about 7. Where the pH value of the medium is less than about 4, the chlorites are as effective as the corresponding hypochlorites.

The sterilization process of my invention comprises subjecting the organism to be killed to the action of chlorous acid or a chlorite, sodium chlorite or calcium chlorite, in a medium having a pH value less than about 7. The acidity of the medium may be controlled by the regulated addition of acid agents, of the class comprising hydrochloric acid, sulphuric acid, acetic acid, benzoic acid, nitric acid, boric acid, and acid salts including sodium and potassium acid phosphates, acid sulphates, acid phthalates and acid fluorides, for example.

The improved fungicide and bactericide of my invention includes, broadly, solutions of the salts of chlorous acid in media having a pH value less than about 7 and also includes mixtures of such salts and acid agents for controlling the acidity of the medium in which the mixture is applied adapted to form such solutions when dissolved in the medium. Suitable acid agents include sodium and potassium acid phosphates, boric acid, and sodium silico fluoride, for example.

The chlorites of the alkali-metals and alkaline earth metals are particularly useful as fungicides and bactericides. However, the chlorite radical is the effective component of the fungicidal and bactericidal solutions of the invention.

In one aspect this invention provides improved chlorite compositions, adapted to be used as fungicides and bactericides or as bleaching agents. These improved chlorite compositions comprise dry mixtures of chlorites, sodium chlorite or calcium chlorite for example, and an acid agent or acid salt such as boric acid, sodium or potassium acid phosphates, and acid sulphates, and sodium silico fluoride, for example. Such mixtures are indefinitely stable, with respect to their chlorite content, are readily soluble in water, and when dissolved form powerful fungicides and bactericides and active bleaching solutions.

The improved chlorite composition of my invention may be used to form solutions for use in washing dairy utensils and milk containers, food containers, and the like, as a substitute for "Dakin's" solution in some instances, for the sour and bleaching operations in laundry practice, and for the bleaching of textiles.

The following examples will further illustrate the invention:

Example I

Two parts of sodium chlorite are mixed with 98 parts of potassium dihydrogen phosphate. Both materials should be finely ground and dry. The mixture is suitable for use in disinfection of food containers including dairy utensils.

Example II

One part of sodium chlorite is mixed with two parts of sodium silico fluoride. This mixture is suitable for use in laundries, to be used in solution in place of the usual sour. Its use eliminates the necessity of applying bleach to the suds as is usually done.

This application is a continuation-in-part of my application for Chemical manufacture filed February 12, 1932, Serial No. 592,651.

I claim:

1. A stable fungicidal and bactericidal composition comprising a material selected from the group consisting of chlorous acid and the soluble salts of chlorous acid.

2. A stable fungicidal and bactericidal composition comprising the chlorites of the metals of the group consisting of the alkali metals and the alkaline earth metals.

3. A stable fungicidal and bactericidal composition comprising mixtures of acid agents and the chlorites of the metals of the group consisting of the alkali metals and the alkaline earth metals.

4. A stable fungicidal and bactericidal composition comprising mixtures of the soluble salts of chlorous acid and acid agents.

5. A sterilization process comprising subjecting the organism to be killed to the action of the chlorite radical in a medium having a pH value less than about 7.

6. A sterilization process comprising subjecting the organism to be killed to the action of a chlorite of metal of the group comprising the alkali metals and the alkaline earth metals in a medium having a pH value less than about 7.

7. A sterilization process comprising subjecting the organism to be killed to the action of a soluble salt of chlorous acid in a medium having a pH value less than about 7.

8. A stable chlorite composition comprising a dry mixture of a soluble chlorite and an acid agent.

9. A stable chlorite composition comprising a dry mixture of a soluble chlorite and an acid salt.

10. A stable chlorite composition comprising a dry mixture of a chlorite of the metals of the group consisting of the alkali metals and the alkaline earth metals and an acid agent.

11. A fungicidal and bactericidal solution comprising chlorous acid in a medium which has a pH value less than about 7.

MAURICE C. TAYLOR.